Oct. 2, 1962
D. E. STACKHOUSE
3,056,228
FISH LURE
Filed April 3, 1961
2 Sheets-Sheet 1
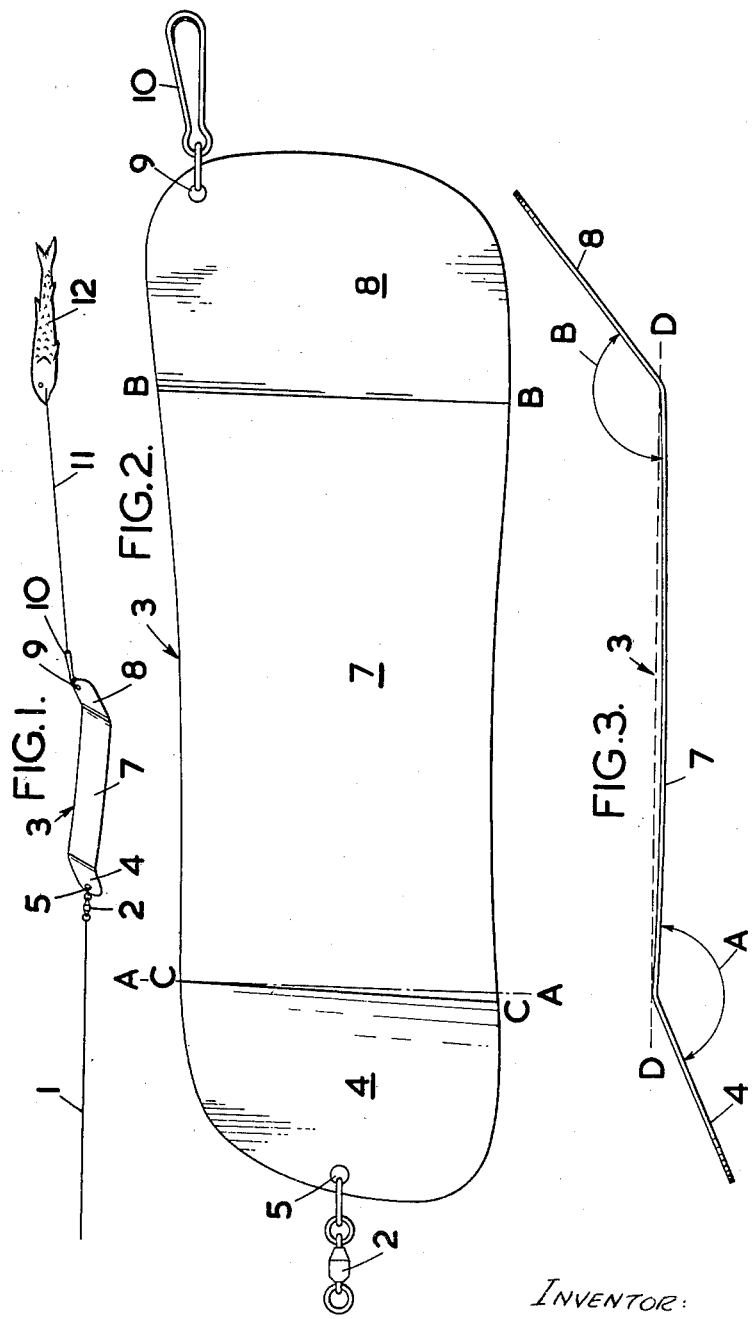
INVENTOR:
DONALD EDWARD STACKHOUSE
By J. Irving Silverman
Att'y Oct. 2, 1962
D. E. STACKHOUSE
3,056,228
FISH LURE
Filed April 3, 1961
2 Sheets-Sheet 2
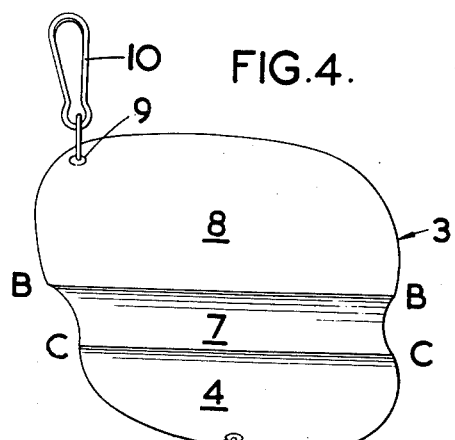
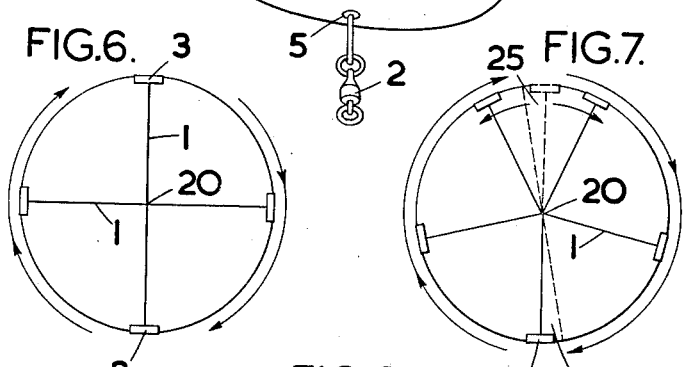
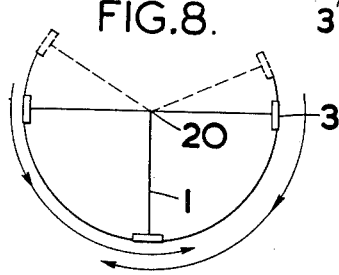
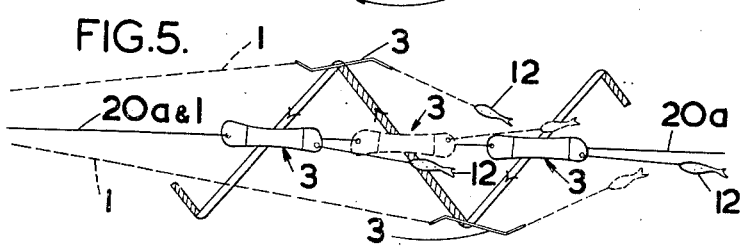
INVENTOR:
DONALD EDWARD STACKHOUSE
By J. Irving Silverman
Att'y

United States Patent Office 3,056,228
Patented Oct. 2, 1962

3,056,228
FISH LURE
Donald Edward Stackhouse, 6570 Nelson Ave., Horseshoe Bay, Vancouver, British Columbia, Canada
Filed Apr. 3, 1961, Ser. No. 100,044
Claims priority, application Canada Apr. 20, 1960
1 Claim. (Cl. 43—42.51)

This invention relates to a fish lure and in particular to an improved fish lure of the type commonly known as an attractor or flasher. Henceforth the term flasher will be employed.

Normally a flasher is secured to a fish line through the intermedia of a swivel connector and, in turn the bait, which for example, if fishing for salmon might be a herring, is secured to the flasher by means of a leader so that the bait is towed along some distance behind the flasher, simulating its movements in a normally somewhat modified manner. Of course the purpose of a flasher is twofold; it should in itself act as a means for attracting fish and furthermore, it should cause the bait to imitate the natural movements of a live fish.

Numerous flashers have previously been proposed with varying degrees of success being achieved through their use. However, most of the proposed flashers have, for one reason or another, suffered from one or more disadvantages. For example, when drawn through the water, some flashers operate properly only at one velocity. Other flashers do not impart to the trailing bait the required natural movements and, in fact, insofar as many of the flashers today on the market are concerned, their behaviour is such that it could definitely be improved upon. It is known that the behaviour of a flasher is, generally speaking, dependent on two factors, the design of the flasher itself and the velocity with which it is drawn through the water. Furthermore, in many instances, it does not appear from a study of the flashers presently known that their designers have fully appreciated the fact that even a relatively slight change in design can result in an unexpected and often improved behaviour. However, this fact appears to be essentially correct as it has been found that a slight alteration of the basic structure of many known flashers can, on one hand, improve their behaviour or, on the other hand, render their behaviour far from satisfatcory. This fact will be more clearly demonstrated hereinbelow.

The design of the improved flasher constructed in accordance with the present invention has been arrived at only after a rather detailed study had been made of the overall behaviour of flashers of various designs. Of course, anyone designing a flasher must be familiar with the natural movements executed by fish of various species as it is these movements which must be imitated by the bait whose behaviour depends, of course, primarily on the flasher to which it is connected.

It is believed that a flasher constructed in accordance with the present invention will satisfy, to a greater extent than was previously possible, the various requirements for a flasher which is to behave in a satisfactory manner under various circumstances and even when drawn through the water with varying velocities.

Flashers constructed in accordance with the present invention can be easily and economically manufactured but it should be appreciated that its present simplicity has been achieved only after the expenditure of a great amount of time on its design.

An object of the present invention is to provide an improved flasher which is attractively operative over a wide range of speeds.

In accordance with one aspect the present invention relates to a flasher comprising an elongated forwardly tapering, generally rectangular plate of uniform thickness having rounded end marginal edges and inwardly curved side marginal edges; a flat, front portion of said plate being folded along a front, straight, substantially transversely extending fold line to one side of said plate and a flat, rear portion of said plate being folded along a rear, straight, substantially transversely extending fold line to the other side of said plate, said front and rear fold lines being non-parallel and the area of said rear portion being greater than that of said front portion, with the centre portion of said plate between said fold lines being longitudinally concave, and the obtuse angle between said front and centre portions being greater than the obtuse angle between said centre and rear portions; swivel securing means located adjacent the leading edge of said front portion substantially on its longitudinal centre line; and connector securing means located adjacent the trailing edge of said rear portion offset from its longitudinal centre line.

In the accompanying drawings one embodiment of the present invention is illustrated. The drawings also include a number of diagrammatic illustrations showing the behaviour of the flasher under various conditions. In these drawings:

FIGURE 1 is a perspective view of a flasher constructed in accordance with the present invention showing the manner in which the flasher would normally be used;

FIGURE 2 is a plan view of the flasher of FIGURE 1, somewhat enlarged;

FIGURE 3 is a side view of the flasher of FIGURE 2;

FIGURE 4 is an end view of the flasher of FIGURE 2 with the rear of the flasher tilted slightly upward to more clearly show the relative positions of the flasher's various portions;

FIGURE 5 is a diagrammatic illustration showing the path followed by the flasher when it is drawn through the water at a relatively high trolling velocity;

FIGURE 6 is a diagrammatic illustration showing the path of travel of the flasher as it would appear when viewed from the right hand end of, and at right angles to, FIGURE 5;

FIGURE 7 is similar to FIGURE 6, but illustrates the behaviour of the flasher when drawn through the water at a normal trolling velocity; and FIGURE 8, also similar to FIGURE 6, illustrates the behaviour of the flasher when drawn through the water at a relatively slow trolling velocity.

Looking firstly at FIGURE 1 it will be seen that a fish line 1 has attached to its end a swivel 2 which in turn is secured at 5 to the front or leading portion 4 of a flasher 3. The flasher 3 is formed from a unitary blank of proper shape struck from sheet brass. The flasher might also be assembled from three separate blanks suitably connected together although this would not normally be as satisfactory. The point of attachment 5 of the swivel is positioned adjacent the leading edge and substantially mid-way between the side edges of portion 4. Flasher 3 also includes a centre portion 7 and a rear or trailing portion 8 to which is secured, at 9, a connector 10. It will be noted that the front portion 4 is offset to one side of the centre portion 7 and that the rear portion 8 is offset to the other side of the centre portion. A leader 11 secured to connector 10 is provided with a hook (not shown) on which the bait 12 is speared. Of course the hook is provided also for the purpose of hooking any fish attempting to take bait 12. The point of attachment 9 of the connector 10 is situated adjacent the trailing edge of rear portion 8 but is set off to one side of the centre line thereof as shown. The reason for this will be noted hereinafter.

Looking now at FIGURES 2, 3 and 4 it will be seen that the fold line C—C separating the front portion 4 of the flasher from its centre portion 7 is not parallel to fold line B—B separating the centre portion from the rear portion 8. Broken line A—A, parallel to fold line B—B clearly illustrates this feature. However, as will be noted from FIGURE 4, fold lines B—B and C—C are co-planar. The front portion 4 of the flasher is bent to one side of the centre portion 7 at an obtuse angle A with respect thereto and rear portion 8 is bent to the other side of the centre portion 7 at an obtuse angle B with respect thereto as is clearly shown in FIGURE 3. In this embodiment obtuse angle A is approximately one-hundred and fifty-five degrees (155°) and obtuse angle B is approximately one-hundred and forty-five degree (145°). Both the front and rear portions of the flasher are flat but the centre portion is somewhat concave as is clearly shown in FIGURE 3 as line D—D is a straight line. It will be noted that the degree of concavity of the flasher is rather slight. Nevertheless, as will be demonstrated hereinafter, this concavity does normally improve its behaviour.

When describing the operation of the flasher, reference will frequently be made to the diagrammatic illustrations of FIGURES 5, 6, 7 and 8. Looking firstly at FIGURE 5 it will be seen that when the flasher is drawn through the water at a relatively fast trolling velocity the flasher describes a spiral path but does not rotate about its own axis.

In FIGURES 6, 7 and 8 the reference numeral 20 designates the towing centre which, theoretically, would be the end of the fishing rod being used. Practically speaking, it will be realized that in view of the relatively long length of fish line used when trolling, the towing centre is probably, in fact, positioned somewhere along the fish line not too far ahead of the swivel 2 which secures the flasher to the line.

A line 20a extending rearwardly of centre 20 will be designated as the towing axis and it is this line about which the flasher rotates, as will be noted from FIGURE 6, when towed at a relatively high trolling velocity. At this linear velocity the angular velocity with which the flasher describes its orbit about the towing axis is substantially constant. For purposes of clarity this action of the flasher will hereinafter be designated as a spinning action although, as previously mentioned, the flasher is spinning about its towing axis and not about its own axis.

When the trolling velocity of the flasher is decreased to a normal velocity the flasher continues to describe an orbit, as shown by FIGURE 7, but its angular velocity when describing this orbit varies and, in fact, decreases as the flasher approaches the uppermost sector 25 of its orbit and of course increases as it approaches the lowermost sector 26 of its orbit. Normally, when at the uppermost sector, or top, of its orbit the flasher pauses for a moment, and then continues about its orbit. This motion will henceforth be designated as a flipping action.

When the velocity with which the flasher is drawn through the water is decreased yet further to a relatively slow trolling velocity the flasher will no longer describe an orbit about its towing axis but instead, as shown in FIGURE 8, it will merely describe an arc. As the flasher approaches the uppermost sectors of its arc its angular velocity will decrease and as it approaches its lowermost sector its angular velocity will increase. This action will henceforth be designated as a dodging action.

Thus, in summary, at a relatively fast trolling velocity the flasher executes a spinning action; at a normal trolling velocity the flasher executes a flipping action and at a relatively slow trolling velocity of the flasher executes a dodging action.

Of course, with the bait 12 being attached to the trailing edge of the rear portion 8 of the flasher 3 it will execute, in a somewhat modified manner, actions similar to those being executed by the flasher. This is demonstrated in the schematic illustration of FIGURE 5 wherein the bait 12 has followed substantially the same, although modified, path as has the flasher 3.

The flasher described above has been found to be one of the most suitable designs tested but it can be modified to some extent without departing from the scope of the present invention. However the above-described design should not be altered to too great an extent or its behaviour will differ greatly from that of the described embodiment, and thus, will probably not be as satisfactory for the intended purpose.

For example, it has been noted that the above-described flasher has flat front and rear portions. It has been found that with the front and rear portions flattened in this manner a flasher having a somewhat livelier action, whether it be spinning, flipping or dodging, is provided. Some of the flashers previously proposed had front and rear portions which were gradually curved in opposite directions from the centre portion but this has been found not to be as satisfactory as having them flat. Furthermore the use of flat front and rear portions and the resultant sharp fold lines decreases the overall flexibility of the flasher and also makes it somewhat easier to properly adjust angles "A" and "B."

Angles "A" and "B" and the diverging fold lines B—B and C—C are closely related to one another. A change in the divergence of lines B—B and C—C causes a change in the flasher's dodging action or side-to-side motion when it is drawn through the water at a relatively slow velocity. When the divergence between lines B—B and C—C was increased the flasher would dodge more quickly in an unsuitable manner and it was then necessary to alter angles "A" and "B" to cause the flasher's behaviour to return to normal. The angles "A" and "B" also control the distance of sweep and the angular velocity with which the flasher describes its orbit when being towed at a relatively fast trolling velocity. For example, if the angle "A" which is normally approximately 155° was flattened to approximately 170° the sweep would become wider and longer. Conversely, if the angle "A" was decreased to approximately 140° the sweep would become much tighter and shorter. Thus, each of the flasher's actions, spinning, flipping and dodging, are governed by the combined features of the unparallel fold lines B—B and C—C, the angles "A" and "B," and the flat front and rear portions 4 and 8.

The slight concavity in the centre portion 7 of the flasher 3 makes the flasher generally more sensitive and in particular more sensitive when being towed at a normal towing velocity thus to provide a much livelier action than would be achieved through the use of a flat centre portion.

The offset point of attachment 9 of connector 10 to the rear portion 8 of the flasher has been incorporated into the design of this embodiment of the flasher in order to cause the bait to behave in a somewhat more erratic manner than it would otherwise under same conditions. The conditions under which this point of attachment is of particular importance is when the flasher is being towed at a normal or a slow trolling velocity. At these velocities the offset point of attachment causes the flasher to execute an elliptical orbit when towed at its normal velocity and a portion of an elliptical orbit, or an elliptical arc when towed at its slow velocity as in both instances the flasher moves further to one side of its towing axis than to the other side of its axis. For purposes of clarity the diagrammatic illustrations of FIGURES 7 and 8 do not show an elliptical orbit or arc but merely show a circular path. However, insofar as effectiveness of the flasher is concerned it has been proven that the offset point of attachment is definitely an advantage and accordingly should be employed when constructing a flasher in accordance with the present invention.

In summary therefore the present invention provides not only a flasher which is simple in design and accordingly, can be easily and inexpensively manufactured but also, as a result of an extended and detailed study of its performance, one which is well thought out and accordingly is extremely effective in imparting to its associated bait the natural movements of a living fish.

I claim:

A flasher comprising an elongated forwardly tapering, generally rectangular plate of uniform thickness having rounded end marginal edges and inwardly curved side marginal edges; a flat, front portion of said plate being folded along a front, straight, substantially transversely extending fold line to one side of said plate and a flat, rear portion of said plate being folded along a rear, straight, substantially transversely extending fold line to the other side of said plate, said front and rear fold lines being non-parallel and the area of said rear portion being greater than that of said front portion, with the centre portion of said plate between said fold lines being longitudinally concave, and there being an obtuse angle formed between said front and centre portions which is greater than an obtuse angle formed between said centre and rear portions; swivel securing means located adjacent the leading edge of said front portion substantially on its longitudinal centre line; and connector securing means located adjacent the trailing edge of said rear portion offset from its longitudinal centre line.

References Cited in the file of this patent

UNITED STATES PATENTS

| | | |
|---|---|---|
| 1,598,958 | Crosby | Sept. 7, 1926 |
| 1,831,267 | Schwarz | Nov. 10, 1931 |
| 2,514,938 | Craig | July 11, 1950 |
| 2,608,787 | Krogue | Sept. 2, 1952 |